United States Patent [19]

Mathiesen

[11] 3,930,121

[45] Dec. 30, 1975

[54] METHOD FOR CONVERTING A BINARY CODED DATA SIGNAL INTO A P-FSK CODED SIGNAL

[75] Inventor: Odd Mathiesen, Oslo, Norway

[73] Assignee: International Standard Electric Corporation, New York, N.Y.

[22] Filed: Jan. 24, 1974

[21] Appl. No.: 436,309

[52] U.S. Cl. .......... 178/66 R; 325/163; 340/347 DD

[51] Int. Cl.$^{2}$ .......................................... H04L 27/12

[58] Field of Search ........................ 178/66 R, 66 A; 340/347 DD; 325/163, 30; 332/16, 23 R, 23 A; 331/60, 74

[56] References Cited

UNITED STATES PATENTS

| | | | |
|---|---|---|---|
| 3,102,238 | 8/1963 | Bosen | 178/66 A |
| 3,165,583 | 1/1965 | Kretzmer et al. | 178/66 R |
| 3,454,718 | 7/1969 | Perreault | 325/163 X |

*Primary Examiner*—Benedict V. Safourek
*Attorney, Agent, or Firm*—John T. O'Halloran; Menotti J. Lombardi, Jr.

[57] ABSTRACT

This invention relates to a method for converting a binary coded data signal into a pulse frequency modulated code (P-F SK), where the frequency is that of a transmitter clock when the data signal is low (high), and half that frequency when the data signal is high (low), and where the code always changes state when the data signal changes state.

The highest code frequency is obtained by combining the data signal with the clock signal to produce two signals of half the clock frequency, which two signals are applied to an exclusive OR gate.

6 Claims, 4 Drawing Figures

METHOD FOR CONVERTING A BINARY CODED DATA SIGNAL INTO A P-FSK CODED SIGNAL

BACKGROUND OF THE INVENTION

The present invention relates to a method for converting a binary coded data signal into a pulse frequency modulated code (P-FSK), where the frequency is that of a transmitter clock when the data signal is low (high), and half that frequency when the data signal is high (low), and where the code always changes state when the data signal changes state.

Such a code (P-FSK) and a signal in which this code frequency is divided by two (½ P-FSK) do not contain D.C. components and are therefore considered to be of great advantage in the transmission of data via cables in a local telephone network.

In other words, the P-FSK code is a code where two line pulses with identical polarity are transmitted for every data bit which is binary 0 ( 1 ) and two line pulses with opposite polarity are transmitted for every data bit which is binary 1 ( 0 ). The polarity of the line pulses are furthermore shifted at the transition between every two data bits.

It would be possible to obtain such conversion by simply gating the transmitter clock with the data signal, but this should be avoided because there will be produced transients which would have to be removed by filters.

SUMMARY OF THE INVENTION

It is an object of the present invention to provide a signal converter which is free from transients and which is simple in operation.

According to a broad aspect of the invention there is provided a method for converting a binary coded data signal into a pulse frequency modulated code (P-FSK), where the frequency of said code is that of a clock signal when the data signal is in a first binary state, and where the frequency of said code is half that of said clock signal when said data signal is in a second binary state comprising combining said binary data signal with said clock signal to produce a first binary output signal which changes state at half the frequency of said clock signal when said binary data signal is in said first binary state, generating a second binary output signal having a frequency half that of said clock signal, and combining said first output signal and said second output signal to produce said pulse frequency modulated code.

According to a further aspect of the invention, there is provided an apparatus for converting a binary coded data signal into a pulse frequency modulated code (P-FSK), wherein the frequency of said code is that of a clock signal when the data signal is in a first binary state, and wherein the frequency of said code is half that of said clock signal when said data signal is in a second binary state comprising a source of a binary data signal, a source of a clock signal, means for generating a first binary output signal which changes state at half the frequency of said clock signal when said binary data signal is in said first binary state, means for generating a second binary output signal having a frequency half that of said clock signal, and means for combining said first output signal and said second output signal to produce said pulse frequency modulated code.

The above and other objects of the present invention will be better understood from the following detailed description taken in conjunction with the accompanying drawings, in which:

DESCRIPTION OF THE PREFERRED EMBODIMENT

Figure 1:
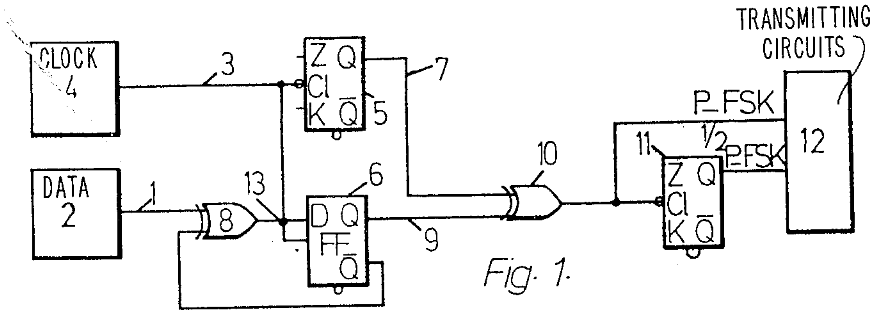
FIG. 1 is a schematic diagram of a first embodiment of the invention.
Figures 2, 3:
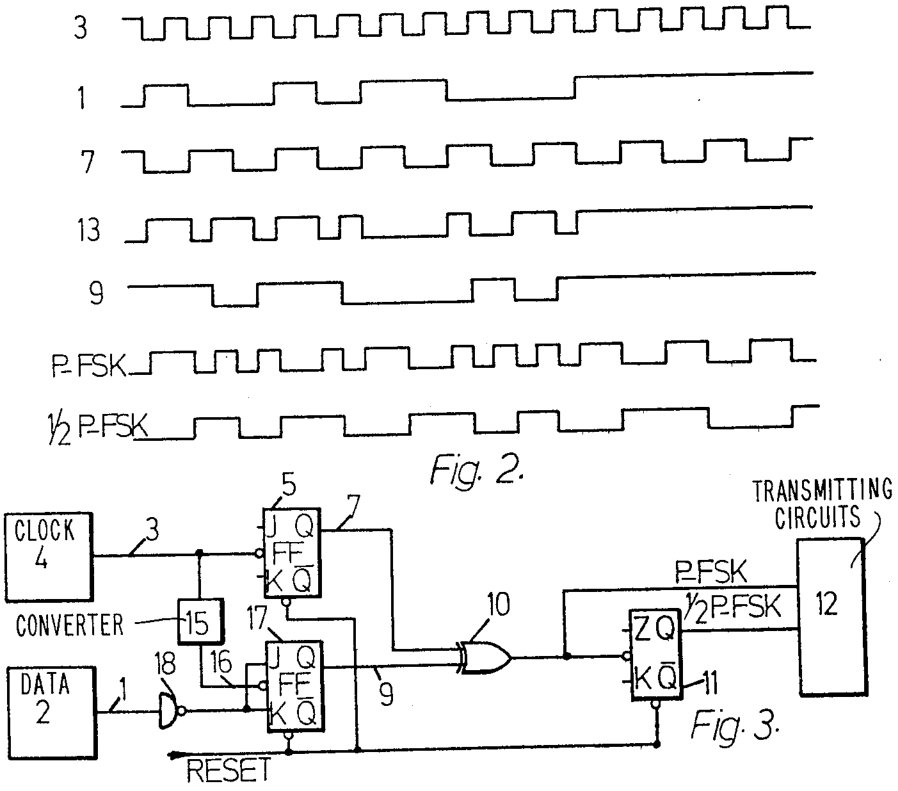
FIG. 2 is a signal diagram showing the main signals appearing at various points in FIG. 1.
FIG. 3 is a schematic diagram of a further embodiment of the invention.

In FIG. 1, the data signals 1 is indicated as being generated from a data source 2, but the origin of these signals is of no importance in connection with this invention. The signals 1 are, however, preferably shaped and timed relatively to a clock pulse signal 3 as illustrated in FIG. 2. A clock pulse generator 4 is provided for generation of the clock pulses 3.

As shown, the clock signal is applied to the trigger inputs of two flip-flop circuits 5 and 6, and the output 7 from the J-K flip-flop 5 is simply a division by two.

The data signal 1 is applied to an exclusive OR gate 8 together with the $\bar{Q}$ output signal from the delay flip-flop 6. The output signal 7 is also the transmitter clock frequency 3 divided by two, but delayed half a clock cycle by using the other phase of the transmitter clock frequency. In addition, the switching of the signal 9 is inhibited when the data signal 1 is high. When the data signal at the input of the exclusive OR gate 8 is low, and the other input ($\bar{Q}$ of flip-flop 6) is low, the output 13 of the exclusive OR gate 8 is low. The next clock pulse 3 will transfer the output 13 of gate 8 to the Q output of flip-flop 6. The $\bar{Q}$ output from the flip-flop 6 will then change to high which causes the output 13 of gate 8 to change state. In this way the output signal 9 from the flip-flop 6 is half the transmitter clock frequency 3 as long as the data signal 1 is low. When the data signal is high, the output 13 from the gate 8 will always be at the same state as the Q output (signal 9) of the flip-flop 6 and the flip-flop 6 is locked to that state.

The signals 7 and 9 are applied to an exclusive OR gate 10 to produce the P-FSK code. If desirable this code may be divided by two, when the line requires a lower frequency. This may be done by a flip-flop 11 as shown.

The P-FSK or ½ P-FSK coded signal are presented to transmitting circuits 12 via which the information is transferred to a receiver at the other end of a cable where it is decoded by a special decoder.

FIG. 2 illustrates the signals discussed hereinabove with respect to the embodiment of FIG. 1.

FIG. 3 illustrates a slightly different embodiment of the invention. Circuit elements and signals identical with elements and signals in FIG. 1 are given the same designations.

The clock signal 3 is applied to the flip-flop 5 and also to a converter 15 which produces a short peak pulse 16 at each positive edge on its input. The delay flip-flop 6 in FIG. 1 has been replaced by a J-K flip-flop 17, to which the data signal is applied after being inverted by inverter 18. The output signal 9 is the same in both embodiments as is the subsequent circuitry.

Figure 4:
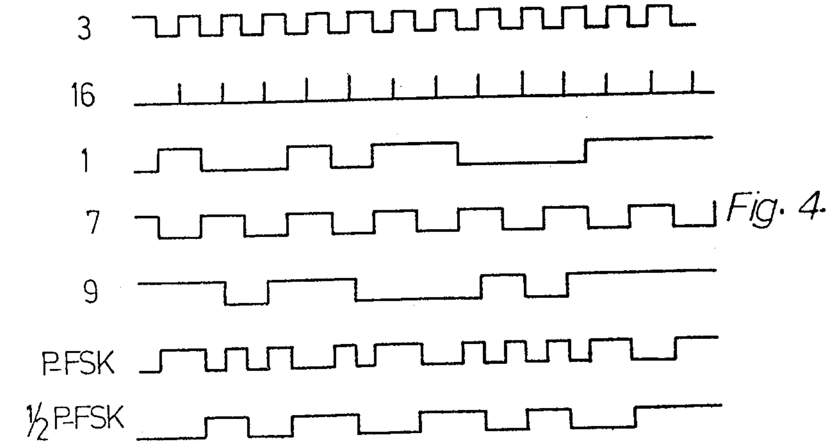
FIG. 4 is a signal diagram showing the main signals at various points in FIG. 3.

The embodiment of FIG. 3 also contains a master reset for resetting flip-flops 5, 11 and 17. FIG. 4 illustrates the main signals generated by the circuit shown in FIG. 3.

It is to be understood that the foregoing description of specific examples of this invention is made by way of example only and is not to be considered as a limitation on its scope.

I claim:

1. An apparatus for converting a binary coded data signal into a pulse frequency modulated code (P-FSK), wherein the frequency of said code is that of a clock signal when the data signal is in a first binary state, and wherein the frequency of said code is half that of said clock signal when said data signal is in a second binary state comprising:

means for providing a binary data signal;

means for providing a clock signal;

means for generating a first binary output signal which changes state at half the frequency of said clock signal when said binary data signal is in said first binary state, said means for generating comprising:

an exclusive OR-gate having first and second inputs, said first input coupled to said data source; and a delay flip-flop having a first input coupled to the output of said exclusive OR-gate and a second input coupled to said clock signal, the inverted output of said delay flip-flop coupled to the second input of said exclusive OR-gate such that when said binary data signal is in a second binary state, said first binary output signal is in the same state as the output of said delay flip-flop;

means for generating a second binary output signal having a frequency half that of said clock signal; and means for combining said first output signal and said second output signal to produce said pulse frequency modulated code.

2. An apparatus according to claim 1, wherein said means for combining is an exclusive OR gate.

3. An apparatus according to claim 1, wherein said means for generating said second binary output signal is a J-K flip-flop.

4. An apparatus according to claim 1, further including means for dividing said pulse frequency modulated code signal by two.

5. An apparatus according to claim 4, wherein said means for dividing is a J-K flip-flop.

6. An apparatus for converting a binary coded data signal into a pulse frequency modulated code (P-FSK), wherein the frequency of said code is that of a clock signal when the data signal is in a first binary state, and wherein the frequency of said code is half that of said clock signal when said data signal is in a second binary state comprising:

means for providing a binary data signal;

means for providing a clock signal;

means for generating a first binary output signal which changes state at half the frequency of said clock signal when said binary data signal is in said first binary state, said means for generating comprising:

an inverter coupled to the output of said data source;

a converter coupled to said clock signal for producing a short peak pulse at the leading edge of each clock pulse;

a J-K flip-flop having J and K inputs coupled to the output of said inverter and having a clock input coupled to the output of said converter;

means for generating a second binary output signal having a frequency half that of said clock signal; and means for combining said first output signal and said second output signal to produce said pulse frequency modulated code.

* * * * *

UNITED STATES PATENT OFFICE

CERTIFICATE OF CORRECTION

PATENT NO. : 3,930,121

DATED : December 30, 1975

INVENTOR(S) : Odd Mathiesen

It is certified that error appears in the above-identified patent and that said Letters Patent are hereby corrected as shown below:

After "Filed Jan. 24, 1974, Appl. No. 436,309"

Add--Claims Priority, Norway April 13, 1973 ... 1544/73--

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*